United States Patent [19]

Hoare

[11] 3,868,058

[45] Feb. 25, 1975

[54] AIR INTAKE DEVICE FOR INTERNAL COMBUSTION ENGINES

[76] Inventor: Terrence Graham Hoare, 82 Doversley Rd., Birmingham, England

[22] Filed: Oct. 5, 1971

[21] Appl. No.: 186,379

[52] U.S. Cl. ............... 236/13, 236/101, 123/122 D
[51] Int. Cl. ............................................. G05d 23/13
[58] Field of Search ............... 236/13, 93, 12, 101; 123/122 D

[56] References Cited
UNITED STATES PATENTS

| | | | |
|---|---|---|---|
| 1,127,627 | 2/1915 | Johnson | 236/12 |
| 1,412,245 | 4/1922 | Hoyt | 236/93 UX |
| 1,922,266 | 8/1933 | Toman | 236/101 |
| 1,934,499 | 11/1933 | Hall | 236/12 |
| 2,398,094 | 4/1946 | Heymann | 123/122 D |
| 2,781,032 | 2/1957 | Sebok et al. | 236/13 |
| 3,084,707 | 4/1963 | Frye | 137/516.25 X |
| 3,112,881 | 12/1963 | Hodgson | 236/87 X |
| 3,459,163 | 8/1969 | Lewis | 236/13 X |
| 3,653,366 | 4/1972 | Hoferer | 123/122 |
| 3,744,715 | 7/1973 | Maddocks | 236/13 |

Primary Examiner—William E. Wayner
Attorney, Agent, or Firm—Thomas J. Greer

[57] ABSTRACT

An air temperature control device for internal combustion engines has a valve for determining the ratio of heated to unheated air disposed between a heated air-inlet and an unheated air inlet, the valve being rigidly mounted on one end of a cantilever-like bimetallic strip disposed downstream of the air inlets. The hot air inlet may provide a greater resistance to air flow than the cold air inlet and the bi-metallic strip may be resilient so that the ratio of unheated to heated air is increased during acceleration.

3 Claims, 2 Drawing Figures

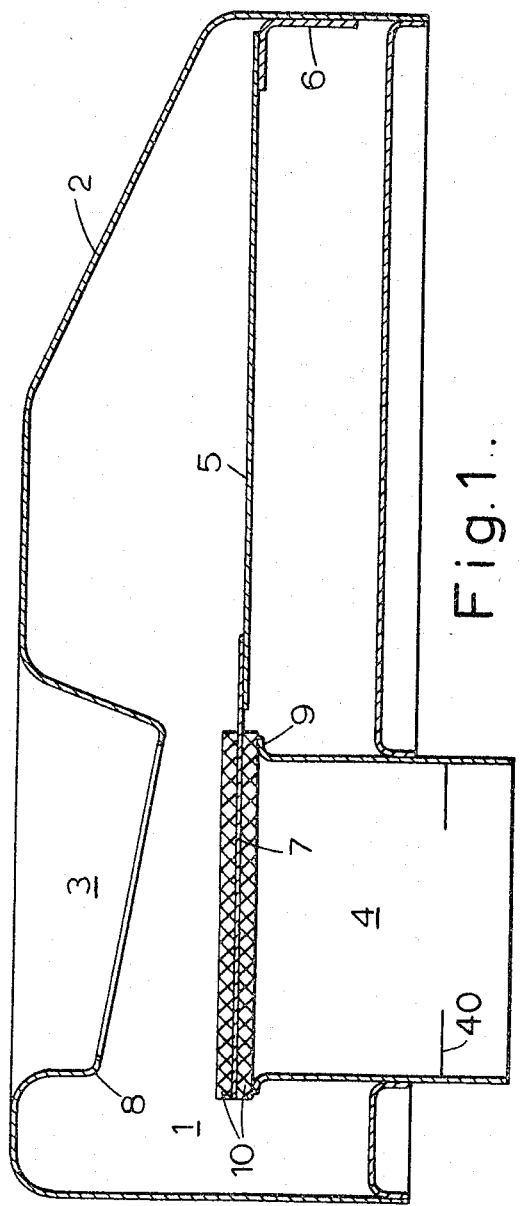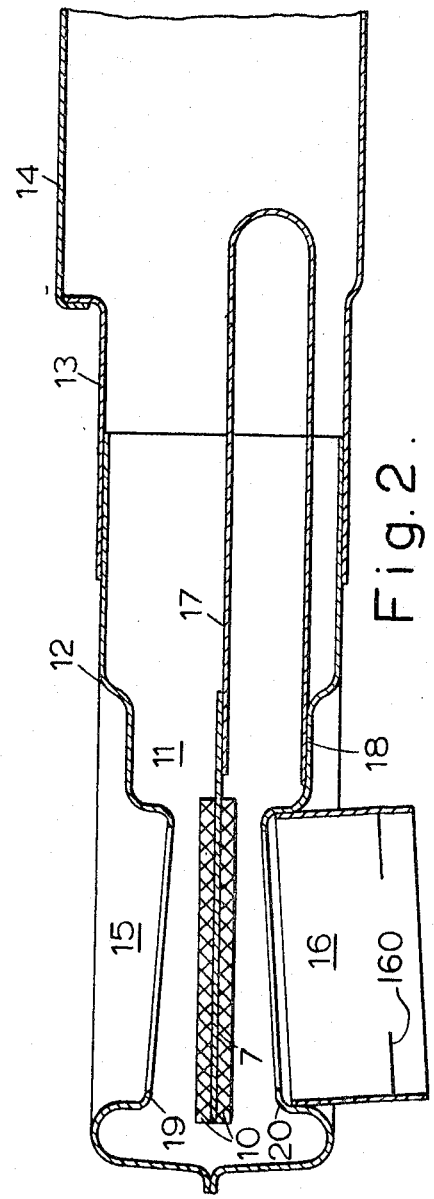

AIR INTAKE DEVICE FOR INTERNAL COMBUSTION ENGINES

This invention relates to an air intake device for internal combustion engines.

One way of appreciably reducing the amount of carbon monoxide and unburnt hydrocarbons emitted from motor vehicle exhaust systems is to arrange matters so that only a lean mixture is supplied to the vehicle's engine throughout its operating range. But this practice adversely affects the driveability of the vehicle, especially during the period following the cold-starting of the engine and preceding attainment of its normal working temperature.

When the engine of a motor vehicle operates solely with a lean mixture, improved vehicle driveability, easier carburetter setting and reduced exhaust emissions can all be achieved if the air supplied to the carburation system of the engine is maintained at a predetermined and substantially constant temperature, irrespective of the ambient temperature prevailing at any time. To this end various arrangements have been proposed in which the induction system of an internal combustion engine has an air-intake duct with two inlets that respectively serve for admitting flows of heated and unheated air which, when both inlets are open, become united during their passage through the duct; and a thermally-responsive device, located within the air-intake duct, actuates a valve (or in some instances two valves) controlling simultaneously the two ingoing air flows so that the air delivered for forming the charge is maintained at a predetermined and substantially constant temperature.

Such prior arrangements referred to above, which are described in the specifications of U.K. Pat. Nos. 185119, 277526, 303235 and 787534, had the control valve (or valves) pivotally mounted, on a spindle (or spindles), and articulated to the thermally-responsive device either directly, by a hinge-like joint, or, indirectly, through a system of levers and links. Unfortunately, the complications inherent in such prior art arrangements have prevented the general adoption of such devices in spite of their theoretical advantages, but it has now been found the desired advantages can be achieved in an intrinsically simpler manner, namely, by eliminating the need for a spindle and an articulated joint or link work.

According to the invention an air intake temperature control device for internal combustion engines comprises a. a housing having two apertures therein disposed opposite to each other and adapted to serve as air inlets for respective heated and unheated air flows, and an aperture adapted to serve as an air outlet for the mixed air flows, b. a cantilever-like bi-metallic strip mounted at one end in the housing and disposed in the path of the mixed air flows;

c. a valve-like vane rigidly mounted on the other end of the bi-metallic strip and disposed between the two opposed air inlet apertures such as to control the relative flows of heated and unheated air according to the result temperature of the mixed air flows.

Preferably the arrangement is such that the device tends to maintain the temperature of the mixed air flow substantially constant.

Advantageously the air inlet aperture for heated flow presents a greater resistance to flow than the aperture for the unheated air flow and the bi-metallic strip is resilient so that in use during acceleration the strip is deflected to increase the ratio of unheated to heated air and thereby provide an increase in the power available during acceleration.

The bi-metallic strip may be either straight or U-shaped, and when the housing is to be exposed to excessive temperatures the strip may be mounted in the housing such that it is thermally insulated therefrom.

Advantageously, the valve-like vane is faced with elastomeric material bonded thereon to promote quiet operation and assist sealing the air inlet apertures.

The invention will now be described, by way of illustration, with reference to the accompanying drawings of which:-

FIG. 1 is a sectional elevation of one embodiment, and

FIG. 2 is a sectional elevation of another embodiment of the invention.

Referring to FIG. 1, the induction system of an internal combustion engine has an air-intake duct 1 which is incorporated in a canister 2 pertaining to the usual engine air cleaner. The canister 2 is so designed that the duct 1 has two inlets 3 and 4 disposed opposite to each other. The inlet 3 admits unheated air, and the inlet 4 admits air that has been heated by passage through a chamber (not shown) shrouding the exhaust manifold or down-pipe of the engine. The canister 2 also includes an outlet (not shown in the sectional view) formed in the right hand side of the lower wall thereof.

A bi-metallic strip 5 is mounted within the air-intake duct 1, by securing one end of the strip to a bracket 6 fixed to the canister 2. The free end of the cantilever-like bi-metallic strip 5 carries rigidly with it a light-weight vane 7 that lies between the two opposing air inlets 3 and 4. These have flanged ends 8 and 9 projecting into the intake duct 1, and the flanged ends 8 and 9 are arranged respectively to conform to the attitude of the vane 7 when it seats.

The vane 7, which constitutes a control valve, is sandwiched between a pair of discs 10 of elastomeric material (eg polyether urethane foam) bonded to the vane. These discs not only give better seating of the vane 7 on the flanged ends 8 and 9 of the air inlets 3 and 4, but also promote quiet operation of the device.

If the temperature within the air-intake duct 1 deviates from the predetermined one, the bi-metallic strip 5 deflects one way or the other and so causes the valve-like vane 7 to change the relative proportions of the heated and unheated air flows until the predetermined air temperature is reached.

In the embodiment depicted in FIG. 2, an air-intake duct 11 is afforded by a casing 12 which is detachably secured to an intake spout 13 of a canister 14 pertaining to the engine air cleaner. The casing 12 has two inlets 15 and 16 disposed opposite to each other. The inlet 15 admits unheated air, and the inlet 16 admits air that has been heated by passage through a chamber (not shown) shrouding the exhaust manifold or down-pipe of the engine.

A substantially U-shaped bi-metallic strip 17 is located within the air-intake duct 11, and a portion of it may, as shown, lie within the canister 14. One end of the strip 17 is fixed to a ledge 18 formed in the casing 12, and the free end of this cantilever-like strip carries rigidly with it the same valve-like vane assembly 7, 10 as already described. The two opposing air inlets 15 and 16 have flanged ends 19 and 20 which are inclined in opposite directions to correspond to the inclination of the vane 7 when it seats.

By making the bi-metallic strip of U-form, two advantages accrue. First, its stiffness is increased as compared with that of a straight cantilever strip of the same effective length, ie., giving the same deflection per degree of temperature change; and, secondly, the air-intake duct can be more compact than would otherwise be the case.

An important attribute of the arrangements described is that in each case the valve-like vane is actuated directly by the translational movement of the bi-metallic strip, thus obviating difficulties which could arise were an intervening mechanical linkage to be employed.

It has been found that the heated air inlets 4 and 16 normally present a greater resistance to air flow than the cold air inlets 3 and 15 due to restrictions in the passage from the exhaust manifold or other heat-exchange means, and where this is not the case the heated air inlets 4 and 16 may easily be restricted by reducing the size of the aperture compared with that of the unheated air inlet; as schematically indicated by restriction 40 in FIG. 1 and 160 in FIG. 2 hence since bi-metallic strips normally have some degree of resilience the strips 5 and 17 may be so formed that the resilience is such that during acceleration the pressure difference generated by the differential resistance to flow through the inlet causes the vane 7 to move towards the hot air inlet thereby increasing the ratio of unheated to heated air and thus providing an increase in the power available from the engine.

What is claimed is:

1. An air intake temperature control device for internal combustion engines which comprises:
   a. a housing having two apertures therein disposed opposite and facing each other and adapted to serve as air inlets for respective heated and unheated air flows, and an aperture adapted to serve as an air outlet for the mixed air flows,
   b. a cantilever-like bi-metallic strip mounted at one end thereof in the housing and disposed in the path of the mixed air flows,
   c. a valve-like vane rigidly mounted on the other end of the bi-metallic strip and disposed between the two opposed and facing air inlet apertures such as to control the relative flows of heated and unheated air according to the result temperature of the mixed air flows, said vane movable towards and away from said air inlets, said vane being sandwiched between discs of elastomeric material, the discs being each at least as large as its respective aperture,
   d. the heated air inlet aperture presenting a greater resistance to air flow than the unheated air inlet aperture, whereby during acceleration a pressure difference is generated across said vane, and in which the bi-metallic strip is resilient, whereby the said pressure difference deflects the strip and causes the valve to increase the ratio of unheated air during acceleration.

2. The air intake control of claim 1 wherein said heated air aperture is of smaller area than said unheated air aperture.

3. The air intake control of claim 1 wherein said bi-metal strip is of U-shape, with the free end thereof carrying said vane.

* * * * *

UNITED STATES PATENT OFFICE
CERTIFICATE OF CORRECTION

PATENT NO. 3,868,058

DATED : February 25, 1975

INVENTOR(S) : Terence Graham Hoare

It is certified that error appears in the above-identified patent and that said Letters Patent are hereby corrected as shown below:

Assignee: BRITISH LEYLAND (AUSTIN-MORRIS) LIMITED
(formerly the British Motor Corporation Limited)
Longbridge, Birmingham, ENGLAND Recorded: July 24, 1974   Reel 3138   Frame 503

Please change the above-identified patent to reflect the above-identified Assignee.

Signed and sealed this 13th day of May 1975.

(SEAL)
Attest:

RUTH C. MASON
Attesting Officer

C. MARSHALL DANN
Commissioner of Patents
and Trademarks